US008526820B1

(12) United States Patent
Atmur et al.

(10) Patent No.: US 8,526,820 B1
(45) Date of Patent: Sep. 3, 2013

(54) HIGH PRESSURE DISPLAY

(75) Inventors: Robert J. Atmur, Whittier, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 12/876,944

(22) Filed: Sep. 7, 2010

(51) Int. Cl.
*H04B 10/00* (2006.01)

(52) U.S. Cl.
USPC .............................. 398/105; 398/116; 398/117

(58) Field of Classification Search
USPC .................................. 398/104–105, 115–117
See application file for complete search history.

(56) References Cited

U.S. PATENT DOCUMENTS

| 5,267,063 A | 11/1993 | Ray |
| 5,504,597 A | 4/1996 | Sprague et al. |
| 5,504,598 A | 4/1996 | Sprague et al. |
| 6,222,686 B1 | 4/2001 | Richard |
| 6,384,982 B1 * | 5/2002 | Spitzer .......................... 359/630 |
| 2004/0021802 A1 | 2/2004 | Yoshino |
| 2005/0237622 A1 | 10/2005 | Yoshino |
| 2006/0066775 A1 | 3/2006 | Toshikiyo |
| 2007/0058261 A1 * | 3/2007 | Sugihara et al. .............. 359/630 |
| 2007/0140057 A1 * | 6/2007 | Webb et al. .................... 367/118 |
| 2010/0149444 A1 | 6/2010 | Hikmet |

* cited by examiner

*Primary Examiner* — Leslie Pascal
(74) *Attorney, Agent, or Firm* — Caven & Aghevli LLC (57) ABSTRACT

Described herein are embodiments of displays which may be used in high pressure environments, e.g., in underwater environments, and systems which utilize such displays. In some embodiments, a system comprises at least one electronic device comprising an optical output, a first optical interface to couple the optical output to an optical transmission medium, a second optical interface coupled to the optical transmission medium, and a display coupled to the second optical interface. In some embodiments the second optical interface comprises a material having a graded index of refraction, and the display comprises an optically transmissive material coupled to the second optical interface to transmit an image from the second optical interface to a reflective surface.

20 Claims, 5 Drawing Sheets

HIGH PRESSURE DISPLAY

RELATED APPLICATIONS

None

BACKGROUND

The subject matter described herein relates to displays for use with electronic device(s), and more particularly to a display which may be used to in high pressure environments, e.g., underwater.

In some circumstances it may be useful to have access to a display module in a high pressure environment, e.g., underwater. By way of example, divers working in underwater environments may wish to use a display module which is associated with, or coupled to, a computing system. Current displays utilize curves lenses, which results in one or more voids in the housing of a display. In high pressure environments such displays collapse.

Accordingly, high pressure displays and associated systems and methods may find utility.

BRIEF DESCRIPTION OF THE DRAWINGS

The detailed description is described with reference to the accompanying figures.

SUMMARY

Described herein are embodiments of displays which may be used in high pressure environments, e.g., in underwater environments, and systems which utilize such displays. In some embodiments, a system comprises at least one electronic device comprising an optical output, a first optical interface to couple the optical output to an optical transmission medium, a second optical interface coupled to the optical transmission medium, and a display coupled to the second optical interface. In some embodiments the second optical interface comprises a material having a graded index of refraction, and the display comprises an optically transmissive material coupled to the second optical interface to transmit an image from the second optical interface to a reflective surface.

In another embodiment, a display comprises an optical interface comprising a material having a graded index of refraction to receive an optical signal from a remote source, an optically transmissive material coupled to the optical interface to transmit an image from the optical interface, and a reflective surface coupled to the optically transmissive material to reflect the image onto a viewing surface.

In another embodiment, a computer program product to assess the integrity of a structural repair to a surface comprises logic instructions stored in a computer readable medium which, when executed by a processor, configure the processor to receive a first strain measurement from an external strain indicator, receive a second strain measurement from the measurement sensor after at least one stress test is applied to the structural repair, and generate a signal when a difference between the first strain measurement and the second strain measurement exceeds a threshold.

In another embodiment, a system comprises a waterborne vehicle having a hull, at least one electronic device on board the waterborne vehicle, the electronic device comprising an optical output, a first optical interface to couple the optical output to an optical transmission medium, a second optical interface coupled to the optical transmission medium, and a display coupled to the second optical interface. The second optical interface comprises a material having a graded index of refraction and the display comprises an optically transmissive material coupled to the second optical interface to transmit an image from the second optical interface to a reflective surface.

DETAILED DESCRIPTION

Described herein are embodiments of displays which may be used in high pressure environments, e.g., in underwater environments, and systems which utilize such displays. In some embodiments, a display is constructed using an optical interface which comprises a material that has an index of refraction which varies across the optical interface. Such materials are sometimes referred to as "gradient index," "gradient index optics," or "graded" refractive index materials. The gradient index optical interface functions as a lens to focus an image onto a reflective surface, which in turn reflects the image onto a viewing surface. Using an optical interface with a gradient index allows the display to be constructed in a solid state form, i.e., without the voids commonly associated with conventional displays. Thus, a display constructed in accordance with this description may be used in high pressure environments without concerns about the display collapsing under pressure.

A display as described herein may be used in conjunction with into an electronic device, e.g., a computing system or the like. In some embodiments an optical output from the electronic device is input into a first optical interface. The optical output may be embodied in electrical signals or in optical signals. A first optical interface transmits the optical output from the electronic device across a transmission medium to a second optical interface which is optically coupled to the display, where an image based on the optical signal may be presented.

In the following description and/or claims, the terms "coupled" and/or "connected," along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct physical contact with each other, but yet may still cooperate and/or interact with each other. For example, "coupled" may mean that two or more elements do not contact each other but are indirectly joined together via another element or intermediate elements.

Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
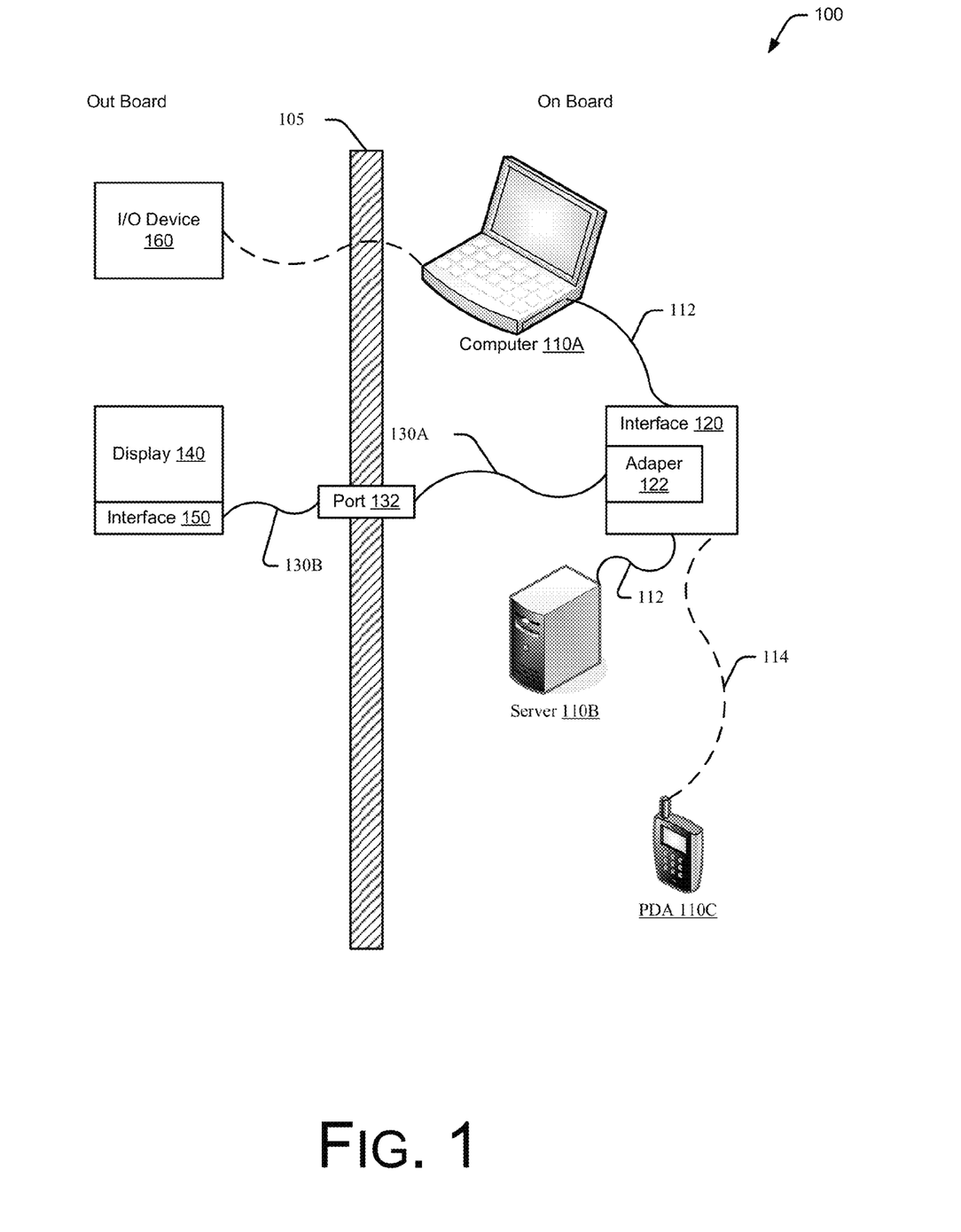
FIG. 1 is a schematic illustration of various components of a system which includes a high pressure display, according to embodiments.

FIG. 1 is a schematic illustration of various components of a system which includes a high pressure display, according to embodiments. Referring to FIG. 1, various components of a system 100 may reside on board a waterborne vessel, e.g., a ship, submarine, or the like, while other components of the system 100 may reside out board the waterborne vessel, e.g., in an underwater environment. The onboard environment is separated from the outboard environment by a hull 105.

In some embodiments, system 100 comprises at least one electronic device which generates an optical output. In the embodiment depicted in FIG. 1 the system 100 comprises three electronic devices: a laptop computer 110A, a server 110B, and personal digital assistant (PDA 110C). The specific number of electronic devices associated with the system 100 is not critical. Herein, the electronic devices 110A, 110B, 110C may be referred to generally by the reference numeral 110.

As illustrated in FIG. 1, electronic devices 110 generate an optical output which may be presented on a display. Laptop computer 110A and PDA 110C may comprise an integrated display, while server 110B may or may not be coupled to a display. The optical output generated by the electronic devices 110 may be input into an optical interface 120. By way of example, an optical output from computers 110A, 110B may be coupled to interface 120 via a cable 112, e.g., n High-Definition Multimedia Interface (HDMI) cable, a coaxial cable, composite video cable, S-Video cable, component video cable, D-Terminal cable, VGA. cable or the like. The particular interface is not critical. PDA 110C may be coupled to optical interface 120 via a similar wired interface or by a wireless connection 114.

Optical interface 120 converts signals from electronic devices 110 to an optical signal, and may include one or more adapters 122 to couple the optical output of interface 120 to an optical transmission medium 130A, which is coupled to a port 132 in the hull 105. By way of example, and not limitation, in some embodiments optical transmission medium 130A may comprise an optical fiber and optical interface 120 may comprise an optical fiber converter to convert between RS232 signals and fiber optic signals. Port 132 provides a connection for optical transmission medium 130A, such that a second optical transmission medium 130B may be coupled to the optical transmission medium 130A. In alternate embodiments the port 132 may provide a pass-through in the hull 105 such that a single optical transmission medium 130 may be used. In alternate embodiments the interface 120 may be coupled directly to the hull 105 such that the port 132 is an integral component of interface 120. The optical transmission medium 130B couples to a second optical interface 150, which is coupled to, or may be integrated with, a display 140.

In alternate embodiments the interface 120 may be omitted and the cable(s) 112 from the electronic devices 110 may extend to the interface 150. In such embodiments the interface 150 may comprise an adapter 122 to convert electrical signals to optical signals.

System 100 may further comprise one or more input/output devices 160, e.g., a mouse or PDA interface, which provides an input/output interface to the electronic device(s) 110 in the on board environment. In some embodiments the I/O device (s) 160 may be coupled to the electronic device(s) 110 via a wireless communication link. In alternate embodiments the I/O devices may be coupled to the electronic device(s) via an optical like through the port 132.

Figure 2:
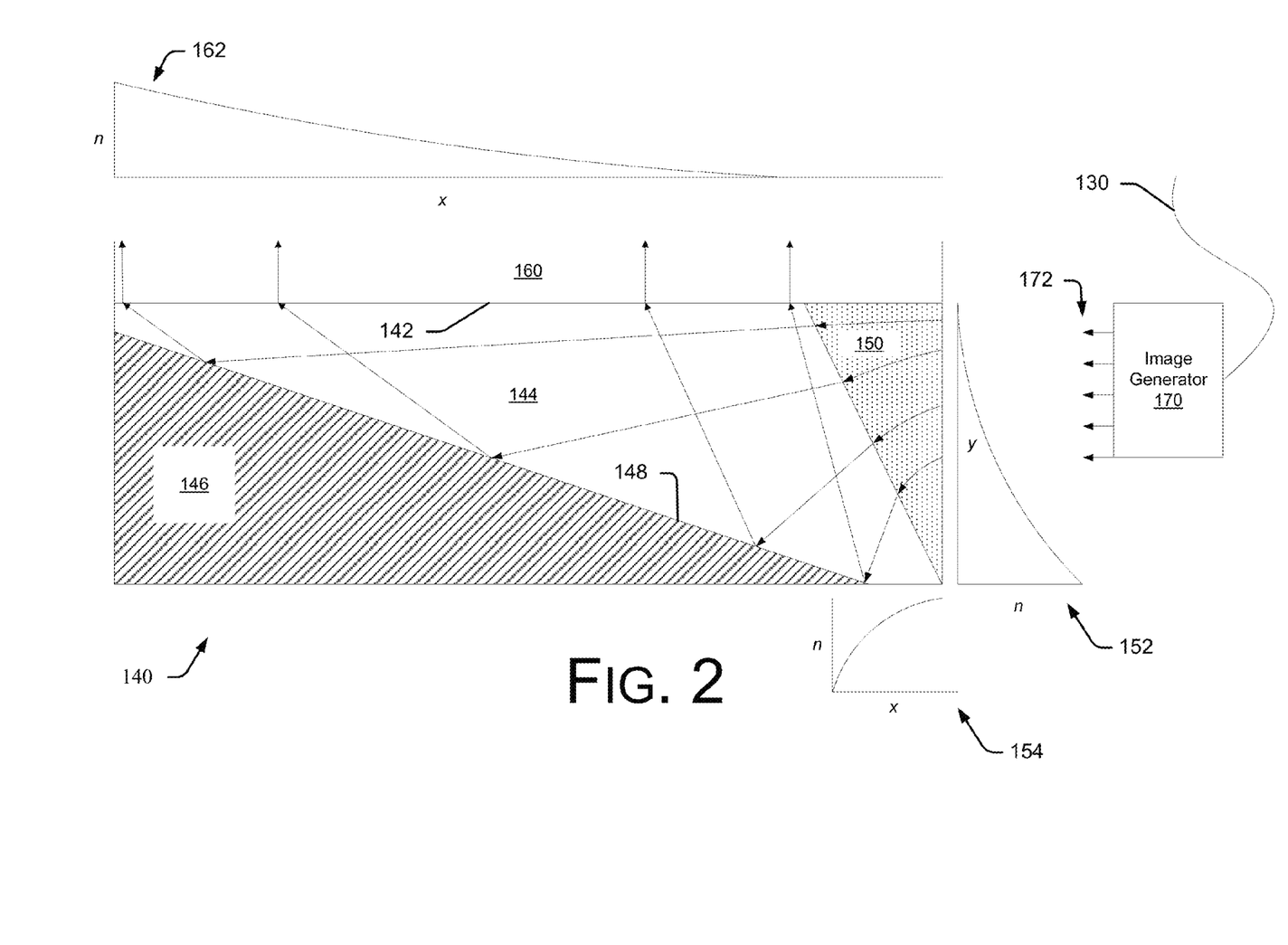
FIG. 2 is a schematic illustration of various components of a high pressure display, according to embodiments.
Figure 3:
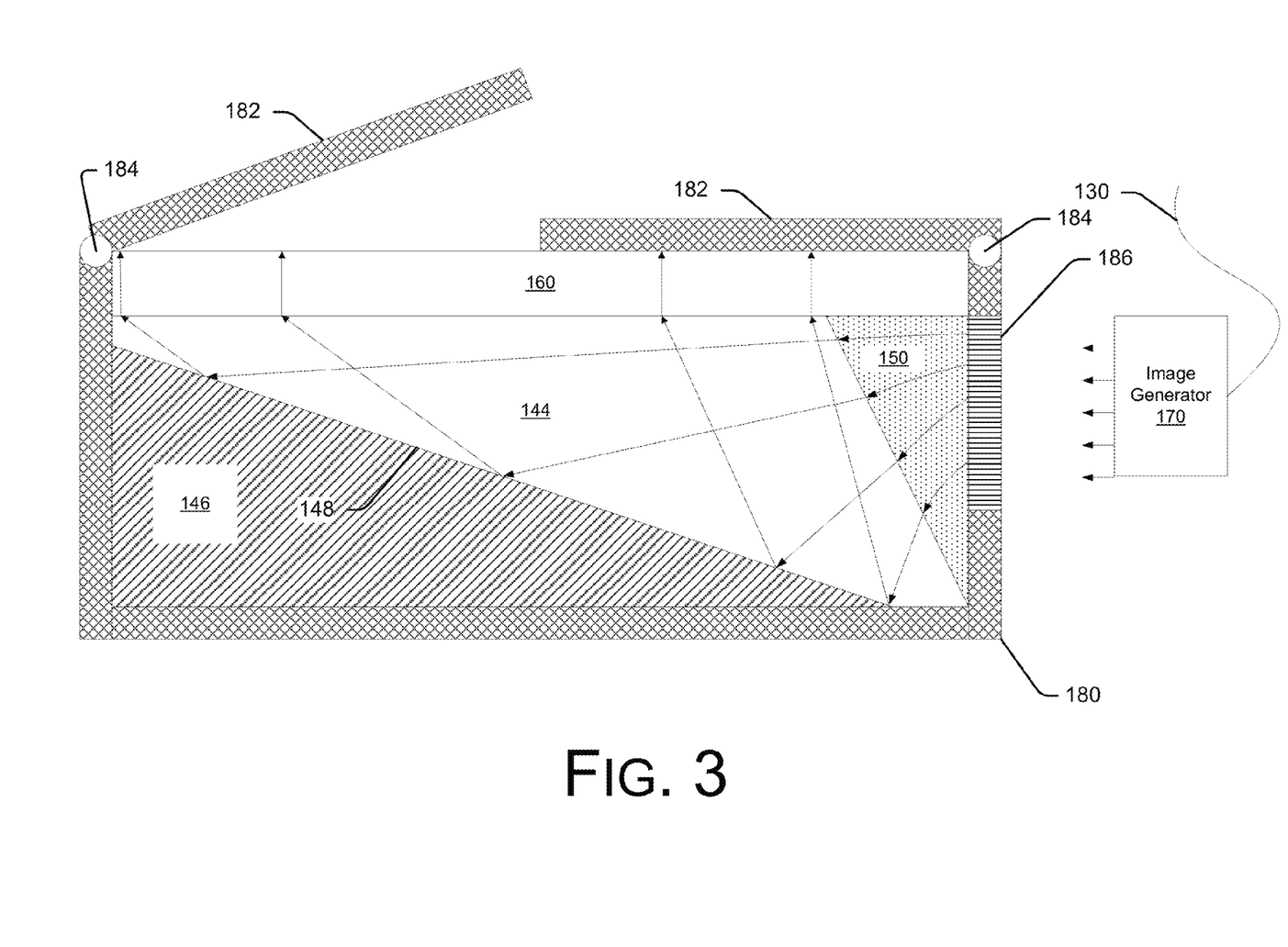
FIG. 3 is a schematic illustration of various components of a high pressure display, according to embodiments.
Figure 4:
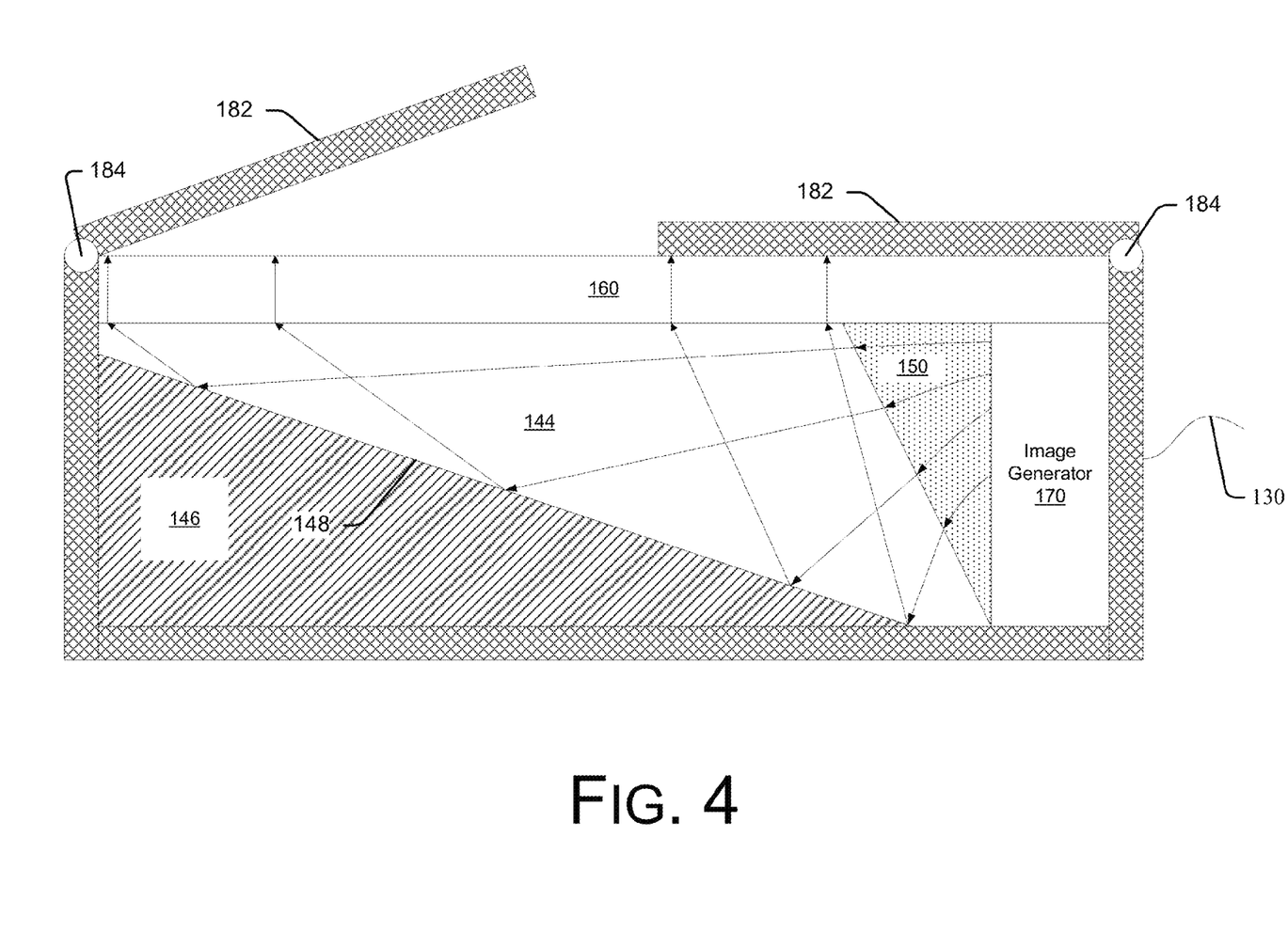
FIG. 4 is a schematic illustration of various components of a high pressure display, according to embodiments.

Having described various components of the system 100, attention is now directed to aspects of the display 140. FIGS. 2-4 are schematics illustration of various components of a high pressure display, according to embodiments. Referring first to FIG. 2, aspects of optical components of a display 140 are described. In some embodiments a display 140 comprises an optical interface 150 comprising a material having a graded index of refraction, an optically transmissive material 144 coupled to the optical interface 150 to transmit an image from the optical interface 150, and a reflective surface 148 coupled to the optically transmissive material 144 to reflect the image onto a viewing surface 142. The display 140 may further comprise a protective surface 160 disposed over the viewing surface 142. An image generator 170 coupled to the optical transmission medium 130 may be coupled to the optical interface 150 to present an image signal to the optical interface 150.

Optical interface 150 and optically transmissive material 144 may be formed from any suitable optically transmissive material, e.g., glass or an optically transmissive polymer. Reflective surface 148 may be on a block 146 of material which need not be optically transmissive. The reflective surface may be formed by coating the surface of block 146 with a reflective material, e.g., silver. Alternatively, the materials 144 and 146 may be formed from materials having relative indices of refraction such that light traveling through optically transmissive material 144 is reflected in accordance with Snell's law at the interface with block 146.

In operation, optical signals on the optical transmission medium 130 are input into the image generator 170, which converts the signals from optical transmission medium 130 into an image. The image generator 170 may be implemented as a solid state display device and may comprise one or more lens assemblies, e.g., a diffraction lens, to direct the output of the image generator 170 as indicated by arrows 172.

The image generator 170 may be optically coupled to the optical interface 150, such that the image from the image generator 170 is input into the optical interface 150. In some embodiments the optical interface 150 may be formed from an optically transmissive material, e.g., glass or an optically transmissive polymer or the like, such that image from image generator 170 may be transmitted through optical interface 150.

In some embodiments the optical interface 150 may utilize gradient optics to transfer the image from the image generator 170 to a reflective surface 148, which reflects the image onto a viewing surface 142. In some embodiments the material from which optical interface 150 is formed may comprise an index of refraction that varies in one dimension as a function of a linear distance from an end of the optical interface 150, as illustrated by the graph 152 plotting the index of refraction, n, against the distance, y, from the end of the optical interface 150 proximate the protective cover 160. In the embodiment depicted in FIG. 2 the optical interface 150 has a low index of refraction in regions proximate the protective cover 160, and the refractive index increases as the distance from the protective cover 160 increases.

In some embodiments the material from which the optical interface 150 is formed may have a refractive index which varies in two dimensions. As illustrated by the graph 154 plotting the index of refraction, n, against the distance, x, from the surface of optical interface 150 which couples to image generator. In the embodiment depicted in FIG. 2 the optical interface 150 has a high index of refraction in regions proximate the surface of optical interface 150 which couples to image generator, and the refractive index decreases as the distance from the surface of optical interface 150 which couples to image generator increases.

Thus, light which enters the optical interface from the image generator 170 will be refracted by progressively greater amounts as the distance from the protective cover 160 increases. Further, in embodiments in which the refractive index varies along as indicated by graph 154 light which enters the optical interface 150 from the image generator 170 will be refracted progressively less as it travels through optical interface 150.

The protective cover 160 may be formed form a material which is optically transmissive, e.g., glass or a transmissive polymer. In some embodiments the protective cover 160 may have a substantially constant index of refraction throughout. In other embodiments, such as the embodiment depicted in FIG. 2, the protective cover 160 may be formed from a material that has a refractive index which varies as a function of a distance from an end of the display 140. As illustrated by the graph 162 plotting the index of refraction, n, against the distance, x, from the end of the display 140. In the embodiment depicted in FIG. 2 the protective cover 160 has a high index of refraction in regions proximate the end of the display 140 which appears on the left hand side of the drawing in FIG. 2, and the refractive index decreases as the distance from the end increases.

Thus, light which enters the protective cover 160 on the left end of the drawing in FIG. 2 will be refracted by a relatively high amount, and light which enters the protective cover 160 farther form the end will be refracted progressively less. As illustrated in FIG. 2, this directs light out of the protective cover at near-normal angles.

One skilled in the art will recognize that the material from which the optical interface 150 may also have an index of refraction which varies in the along the z-axis, which is perpendicular to the plane of the cross-section illustrated in FIG. 2.

In operation light which enters the regions of optical interface 150 proximate the protective cover 160 will be refracted by a relatively small amount. By contrast, light which enters lower regions of the optical interface 150 will be refracted by a relatively high amount. The refracted light is transmitted into the optically transmissive material 144, which has a substantially constant index of refraction. Thus, light travels through the optically transmissive material 144 in a substantially straight line onto a reflective surface 148, which reflects the light onto viewing surface 142 to present the image from image generator 170 on the viewing surface 142. In some embodiments the protective cover 160 also functions to direct light emitted from the display at near-normal angles.

In some embodiments a display 140 may be provided with a housing. FIG. 3 is a schematic, cross-sectional illustration of a display 140 with a housing 180. The display 140 depicted in FIG. 3 is substantially the same as the display 140 depicted in FIG. 2. Referring to FIG. 3, the display 140 may be enclosed in a housing 180 that surrounds at least a portion of the display 140. The housing 140 may comprise one or more doors 182 that open and close on hinges 184 to provide access to the display 140. In addition, the housing 180 may comprise an access opening 186 which allows the image generator 170 to be optically coupled to the optical interface 150.

The embodiment depicted in FIG. 4 is similar to the embodiment depicted in FIG. 3. However, in the embodiment depicted in FIG. 45 the image generator 170 is integrated into the housing 180. In such embodiments the housing 180 may comprise a plug or a port to enable the transmission medium 130 to couple to the image generator 170.

Thus, various embodiments of displays 140 have been described. One skilled in the art will recognize that various components on the display 140 may be modified in accordance with the spirit of this disclosure. By way of example, the geometric shapes of the optical interface 150, transmissive medium 144, and the reflective surface may be modified by increasing or decreasing the angles of the corners of the triangles. Also, although the various surfaces depicted in FIG. 2 are substantially planar, curved surfaces could be implemented.

Figure 5:
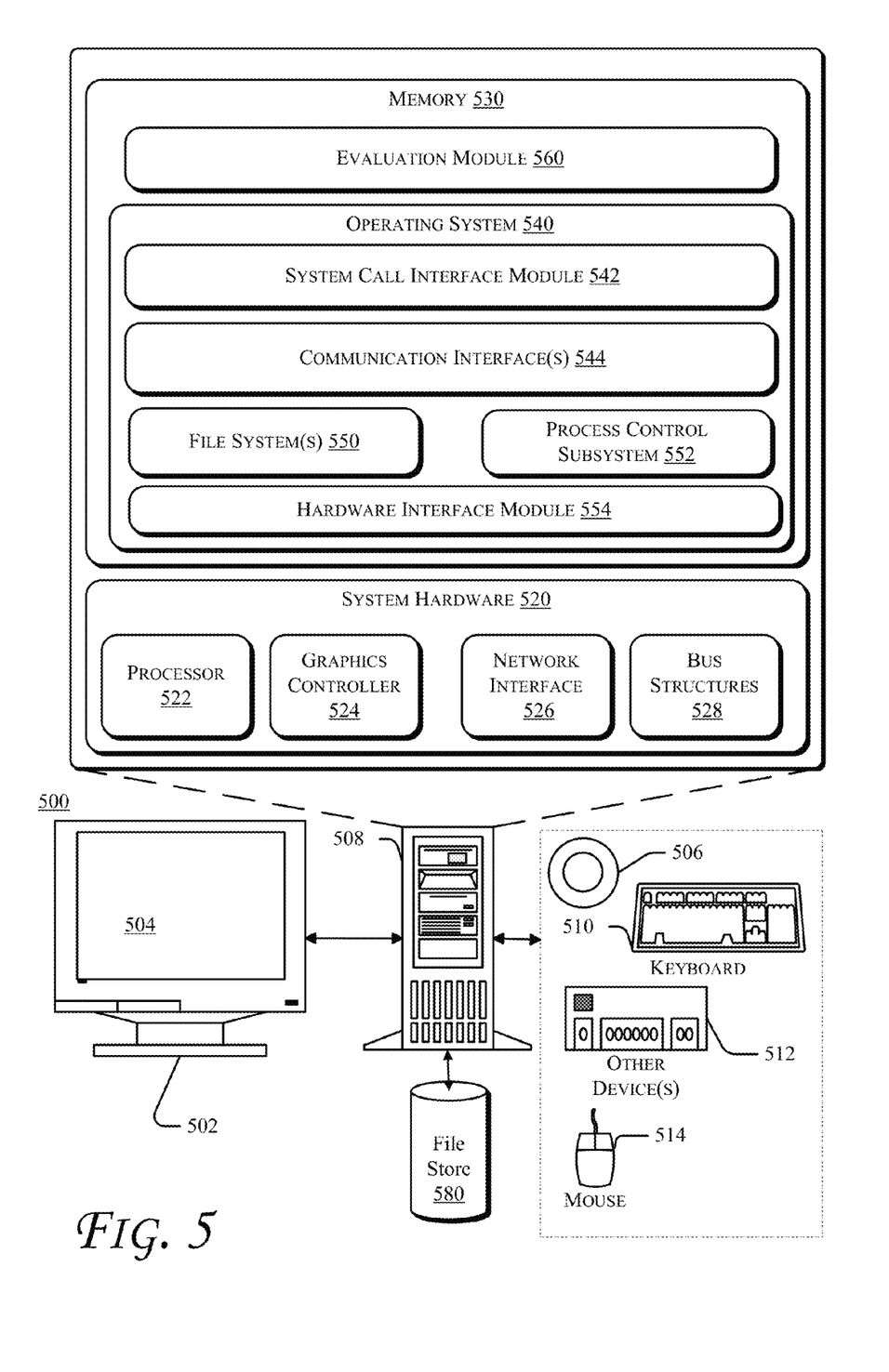
FIG. 5 is a schematic illustration of an electronic device, according to embodiments.

FIG. 5 is a schematic illustration of a computing system 500 that may be used in conjunction with a system 100. In some embodiments, system 500 includes a computing device 508 and one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing device 508 includes system hardware 520 and memory 530, which may be implemented as random access memory and/or read-only memory. A file store 580 may be communicatively coupled to computing device 508. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, video controllers 524, network interfaces 526, and bus structures 528. In one embodiment, processor 522 may be embodied as an Intel® Pentium we processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics controller 524 may function as an adjunction processor that manages graphics and/or video operations. Graphics controller 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 528. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508. Further, memory module 530 may comprise an evaluation module 560 to implement the analysis operations described with reference to FIG. 2.

Operating system 540 may include (or manage) one or more communication interfaces that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

Thus, described herein are embodiments of displays which may be used in high-pressure environments, e.g., underwater. Also described are electronic device such as computer systems to which such displays may be coupled. Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A system, comprising:
   at least one electronic device comprising an optical output;
   a first optical interface to couple the optical output to an optical transmission medium;
   a second optical interface coupled to the optical transmission medium; and
   a display coupled to the second optical interface, wherein:
     the second optical interface comprises a material having a graded index of refraction; and
     the display comprises an optically transmissive material coupled to the second optical interface to transmit an image from the second optical interface to a reflective surface, wherein:
   the first optical interface is disposed inside a hull of a waterborne vehicle; and
   the second optical interface is disposed outside the hull of the waterborne vehicle; and
   the optical transmission medium provides an optical path through the hull of the waterborne vehicle.

2. The system of claim 1, wherein the at least one electronic device comprises a computing device.

3. The system of claim 1, further comprising a remote input/output device coupled to the electronic device via a wireless communication link.

4. The system of claim 1, further comprising:
   a image generator connectable to the second optical interface to present an image signal to the second optical interface.

5. The system of claim 4, wherein:
   the second optical interface comprises an index of refraction that varies as a function of a linear distance from an end of the second optical interface.

6. The system of claim 1, wherein:
   the optically transmissive material has a substantially constant index of refraction.

7. The system of claim 1, wherein the display is coupled to the electronic device by an optical cable, and wherein the second optical interface further comprises at least one image generator to focus an optical input from the optical cable onto the second optical interface.

8. The system of claim 1, wherein the display comprises a protective surface disposed over the viewing surface.

9. The system of claim 8, wherein:
   the protective surface comprises a material having a refractive index which varies as a function of a distance from an end of the protective surface.

10. A display, comprising:
    an optical interface comprising a material having a graded index of refraction to receive an optical signal from a remote source;
    a optically transmissive material coupled to the optical interface to transmit an image from the optical interface; and
    a substantially planar reflective surface coupled to the optically transmissive material to reflect the image onto a substantially planar viewing surface; and
    a protective surface disposed over the viewing surface, the protective surface comprising a material having a refractive index which varies as a function of a distance from an end of the protective surface.

11. The display of claim 10, further comprising:
    a image generator connectable to the optical interface to present an image signal to the optical interface.

12. The display of claim 11, wherein:
    the optical interface comprises an index of refraction that varies as a function of a linear distance from an end of the optical interface.

13. The display of claim 10, wherein:
    the optically transmissive material has a substantially constant index of refraction.

14. A system, comprising:
    at least one electronic device comprising an optical output;
    a first optical interface to couple the optical output to an optical transmission medium;
    a second optical interface coupled to the optical transmission medium; and
    a display coupled to the second optical interface, wherein:
      the second optical interface comprises a material having a graded index of refraction; and
      the display comprises an optically transmissive material coupled to the second optical interface to transmit an image from the second optical interface to a reflective surface,
    wherein the display comprises a protective surface disposed over the viewing surface and the protective surface comprises a material having a refractive index which varies as a function of a distance from an end of the protective surface.

15. The system of claim 14, wherein:

the first optical interface is disposed inside a hull of a waterborne vehicle; and the second optical interface is disposed outside the hull of the waterborne vehicle; and the optical transmission medium provides an optical path through the hull of the waterborne vehicle.

16. The system of claim 14, further comprising a remote input/output device coupled to the electronic device via a wireless communication link.

17. The system of claim 14, further comprising:

a image generator connectable to the second optical interface to present an image signal to the second optical interface.

18. The system of claim 17, wherein:

the second optical interface comprises an index of refraction that varies as a function of a linear distance from an end of the second optical interface.

19. The system of claim 14, wherein:

the optically transmissive material has a substantially constant index of refraction.

20. The system of claim 14, wherein the display is coupled to the electronic device by an optical cable, and wherein the second optical interface further comprises at least one image generator to focus an optical input from the optical cable onto the second optical interface.

* * * * *